(12) United States Patent
Salo et al.

(10) Patent No.: US 9,971,405 B2
(45) Date of Patent: May 15, 2018

(54) TOUCH SENSITIVE INPUT

(75) Inventors: Antti Salo, Lohja (FI); Teppo Tapani Jokinen, Espoo (FI); Jarkko Tapio Saunamaki, Vantaa (FI); Qifeng Yan, Espoo (FI); Piers Andrew, Cambridge (GB); Lotta Partanen, Helsinki (FI); Okan Ogeturk, Hyvinkaa (FI); Mikko Anttilainen, Helsinki (FI); Zoran Radivojevic, Cambridge (GB)

(73) Assignee: Nokia Technologies Oy, Espoo (FI)

( * ) Notice: Subject to any disclaimer, the term of this patent is extended or adjusted under 35 U.S.C. 154(b) by 372 days.

(21) Appl. No.: 12/891,002

(22) Filed: Sep. 27, 2010

(65) Prior Publication Data

US 2012/0075200 A1 Mar. 29, 2012

(51) Int. Cl.
*G06F 3/041* (2006.01)
*G06F 3/01* (2006.01)
*G06F 3/0488* (2013.01)
*G06F 3/0481* (2013.01)

(52) U.S. Cl.
CPC ............ *G06F 3/016* (2013.01); *G06F 3/0488* (2013.01); *G06F 3/04817* (2013.01)

(58) Field of Classification Search
CPC ...... G06F 3/0488; G06F 3/016; G06F 3/0414; G06F 3/04883; G06F 3/0416
USPC ............ 345/173–175; 341/27; 434/113–114; 463/30; 715/702
See application file for complete search history.

(56) References Cited

U.S. PATENT DOCUMENTS

| | | | | |
|---|---|---|---|---|
| 4,516,112 A | * | 5/1985 | Chen | 341/34 |
| 5,510,813 A | * | 4/1996 | Makinwa | G06F 3/041 341/33 |
| 5,825,352 A | * | 10/1998 | Bisset et al. | 345/173 |
| 6,130,665 A | * | 10/2000 | Ericsson | 345/173 |
| 6,392,638 B2 | * | 5/2002 | Hanajima et al. | 345/173 |
| 6,940,494 B2 | * | 9/2005 | Hoshino et al. | 345/173 |
| 7,196,688 B2 | * | 3/2007 | Schena | 345/156 |
| 7,683,889 B2 | * | 3/2010 | Rimas Ribikauskas et al. | 345/173 |
| 7,770,136 B2 | * | 8/2010 | Beeck | G06F 3/017 715/863 |
| 8,026,906 B2 | * | 9/2011 | Molne et al. | 345/174 |

(Continued)

FOREIGN PATENT DOCUMENTS

| | | |
|---|---|---|
| CN | 1602498 A | 3/2005 |
| CN | 1845049 A | 10/2006 |

(Continued)

OTHER PUBLICATIONS

Brion, Alexis, "Touch Screen iPhone Game Controllers", Design vs. Art Blog, http://www.designvsart.com/blog/2009/12/29/touch-screen-iphone-game-controllers/, 2009, 5 pgs.

(Continued)

*Primary Examiner* — Peter D McLoone
(74) *Attorney, Agent, or Firm* — Harrington & Smith

(57) ABSTRACT

An apparatus including: a touch sensitive input responsive to manual actuation; a display output associated with the touch sensitive input; and a controller configured to provide and maintain, in response to a manual actuation at a user selected location of the touch sensitive input, an output at the user selected location to facilitate additional manual actuation via the touch sensitive input in the region of the user selected location.

15 Claims, 4 Drawing Sheets

(56) References Cited

U.S. PATENT DOCUMENTS

Figure 1:
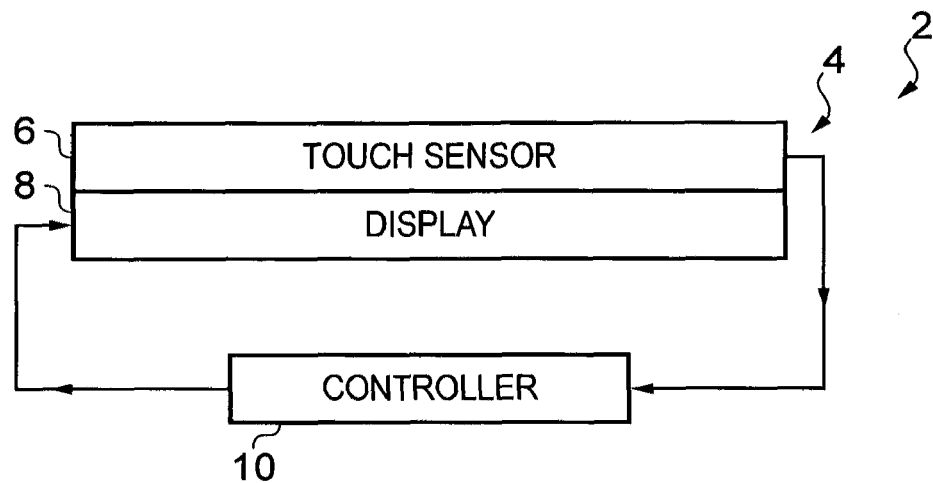

| | | | |
|---|---|---|---|
| 8,154,527 B2* | 4/2012 | Ciesla et al. | 345/173 |
| 8,169,414 B2* | 5/2012 | Lim | 345/173 |
| 8,199,124 B2* | 6/2012 | Ciesla et al. | 345/173 |
| 8,217,904 B2* | 7/2012 | Kim | 345/173 |
| 8,269,731 B2* | 9/2012 | Molne | 345/173 |
| 8,456,438 B2* | 6/2013 | Ciesla et al. | 345/173 |
| 8,477,111 B2* | 7/2013 | Lim | 345/173 |
| 8,542,209 B2* | 9/2013 | Lim | 345/173 |
| 8,587,541 B2* | 11/2013 | Ciesla et al. | 345/173 |
| 8,686,951 B2* | 4/2014 | Vartanian et al. | 345/173 |
| 8,698,750 B2* | 4/2014 | Malabuyo | 345/169 |
| 8,704,790 B2* | 4/2014 | Ciesla et al. | 345/173 |
| 8,717,303 B2* | 5/2014 | Ludwig | 345/173 |
| 8,723,832 B2* | 5/2014 | Ciesla et al. | 345/173 |
| 2002/0003469 A1* | 1/2002 | Gupta | 340/407.1 |
| 2002/0008691 A1 | 1/2002 | Hanajima et al. | 345/173 |
| 2002/0054060 A1* | 5/2002 | Schena | 345/701 |
| 2004/0021643 A1* | 2/2004 | Hoshino | G06F 3/016 345/173 |
| 2005/0024342 A1 | 2/2005 | Young | 345/173 |
| 2005/0030292 A1 | 2/2005 | Diederiks | 345/173 |
| 2006/0001654 A1 | 1/2006 | Smits | 345/176 |
| 2006/0103634 A1 | 5/2006 | Kim et al. | 345/173 |
| 2006/0132455 A1 | 6/2006 | Rimas-Ribikauskas et al. | 345/173 |
| 2007/0229477 A1* | 10/2007 | Ludwig | 345/173 |
| 2008/0018611 A1* | 1/2008 | Serban | G06F 3/0416 345/173 |
| 2008/0119237 A1* | 5/2008 | Kim | 455/566 |
| 2008/0178126 A1* | 7/2008 | Beeck | G06F 3/017 715/863 |
| 2008/0211784 A1* | 9/2008 | Hotelling et al. | 345/173 |
| 2009/0066673 A1* | 3/2009 | Molne et al. | 345/178 |
| 2009/0167507 A1* | 7/2009 | Maenpaa | 340/407.2 |
| 2009/0174687 A1* | 7/2009 | Ciesla et al. | 345/174 |
| 2009/0251410 A1* | 10/2009 | Mori | G06F 3/04812 345/157 |
| 2010/0045612 A1* | 2/2010 | Molne | 345/173 |
| 2010/0066681 A1* | 3/2010 | Malabuyo | 345/169 |
| 2010/0110025 A1* | 5/2010 | Lim | 345/173 |
| 2010/0123679 A1* | 5/2010 | Kim | G06F 3/0338 345/174 |
| 2010/0127140 A1* | 5/2010 | Smith | 248/220.1 |
| 2010/0156813 A1* | 6/2010 | Duarte | G06F 3/0488 345/173 |
| 2010/0171720 A1* | 7/2010 | Craig et al. | 345/173 |
| 2010/0199009 A1* | 8/2010 | Koide | 710/110 |
| 2010/0238114 A1* | 9/2010 | Vartanian et al. | 345/168 |
| 2010/0271328 A1* | 10/2010 | Sekiguchi | G06F 3/0412 345/174 |
| 2010/0275150 A1 | 10/2010 | Chiba et al. | 715/784 |
| 2011/0254672 A1* | 10/2011 | Ciesla et al. | 340/407.2 |
| 2011/0285636 A1* | 11/2011 | Howard | G06F 3/04883 345/173 |
| 2012/0098789 A1* | 4/2012 | Ciesla et al. | 345/174 |
| 2012/0113018 A1* | 5/2012 | Yan | 345/173 |
| 2012/0194461 A1* | 8/2012 | Lim | 345/173 |
| 2012/0194462 A1* | 8/2012 | Lim | 345/173 |
| 2012/0235935 A1* | 9/2012 | Ciesla et al. | 345/173 |
| 2013/0106758 A1* | 5/2013 | Radivojevic et al. | 345/174 |
| 2013/0106765 A1* | 5/2013 | Beecher et al. | 345/174 |
| 2013/0215065 A1* | 8/2013 | Radivojevic et al. | 345/173 |
| 2013/0257787 A1* | 10/2013 | White et al. | 345/174 |
| 2014/0062954 A1* | 3/2014 | Ciesla et al. | 345/174 |
| 2014/0160063 A1* | 6/2014 | Yairi et al. | 345/174 |
| 2014/0160064 A1* | 6/2014 | Yairi et al. | 345/174 |

FOREIGN PATENT DOCUMENTS

| | | |
|---|---|---|
| CN | 101467120 A | 6/2009 |
| CN | 101809531 A | 8/2010 |
| WO | WO-03/050754 A1 | 6/2003 |
| WO | WO-2007/146779 A2 | 12/2007 |
| WO | WO 2009/071750 A1 | 6/2009 |
| WO | WO 2009/088985 A1 | 7/2009 |

OTHER PUBLICATIONS

Trost, Alex (trostik), "On Screen Joystick Preview Android", YouTube, http://www.youtube.com/watch?v-YAD158vb7AY, 2011, 3 pgs.

* cited by examiner

TOUCH SENSITIVE INPUT

TECHNOLOGICAL FIELD

Embodiments of the present invention relate to touch sensitive input. In particular, they relate to a user interface comprising: a touch sensitive input responsive to manual actuation and a display output associated with the touch sensitive output.

BACKGROUND

Apparatuses that have a user interface comprising a touch sensitive input responsive to manual actuation and a display output associated with the touch sensitive output, are not always easy to use compared to a dedicated keyboard.

BRIEF SUMMARY

According to various, but not necessarily all, embodiments of the invention there is provided an apparatus comprising:
a touch sensitive input responsive to manual actuation;
a display output associated with the touch sensitive input; and
a controller configured to provide and maintain, in response to a manual actuation at a user selected location of the touch sensitive input, an output at the user selected location to facilitate additional manual actuation via the touch sensitive input in the region of the user selected location.

According to various, but not necessarily all, embodiments of the invention there is provided a method comprising:
detecting manual actuation at a user selected location of a touch sensitive input,
providing and maintaining an output at the user selected location to facilitate additional manual actuation via the touch sensitive input in the region of the user selected location.

According to various, but not necessarily all, embodiments of the invention there is provided a computer program product comprising computer program instructions which when loaded into a processor enable the processor to provide and maintain, in response to an input indicative of a manual actuation at a user selected location of a touch sensitive input, an output at the user selected location to facilitate additional manual actuation via the touch sensitive input in the region of the user selected location.

According to various, but not necessarily all, embodiments of the invention there is provided an apparatus comprising:
a user interface comprising:
  a touch sensitive input responsive to manual actuation; and
  a display output associated with the touch sensitive input; and
a controller configured to provide and maintain, in response to a manual actuation at a user selected location of the touch sensitive input, a haptic output at the user selected location via the user interface in the region of the user selected location.

According to various, but not necessarily all, embodiments of the invention there is provided an apparatus comprising:
a proximity sensitive input responsive to a manual actuation;
a display output associated with the proximity sensitive input; and
a controller configured to provide, in response to a manual actuation at a user selected location of the proximity sensitive input, deformation feedback at the user selected location that enables user perception of a deformation in the user interface at the user selected location.

Some, but not necessarily all, embodiments of the invention may make it apparent to a user whether an effective manual actuation has been made.

Some, but not necessarily all, embodiments of the invention may make it apparent to a user how manual actuations should be made.

Some, but not necessarily all, embodiments of the invention may physically facilitate additional manual actuations by, for example, changing a physical configuration of the apparatus.

Some, but not necessarily all, embodiments of the invention may facilitate additional manual actuations by, for example, changing visual content on the display output.

BRIEF DESCRIPTION

Figure 2:
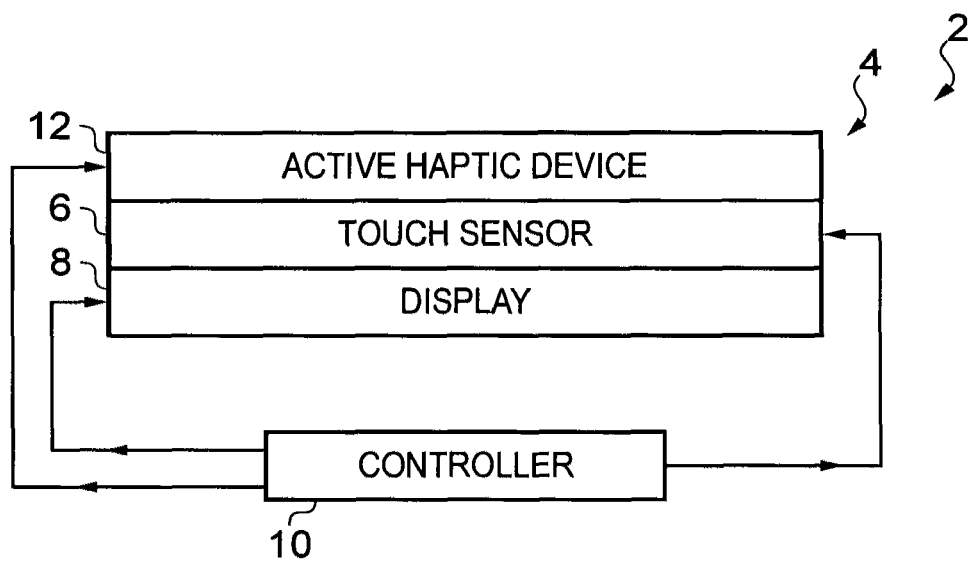
Figure 3:
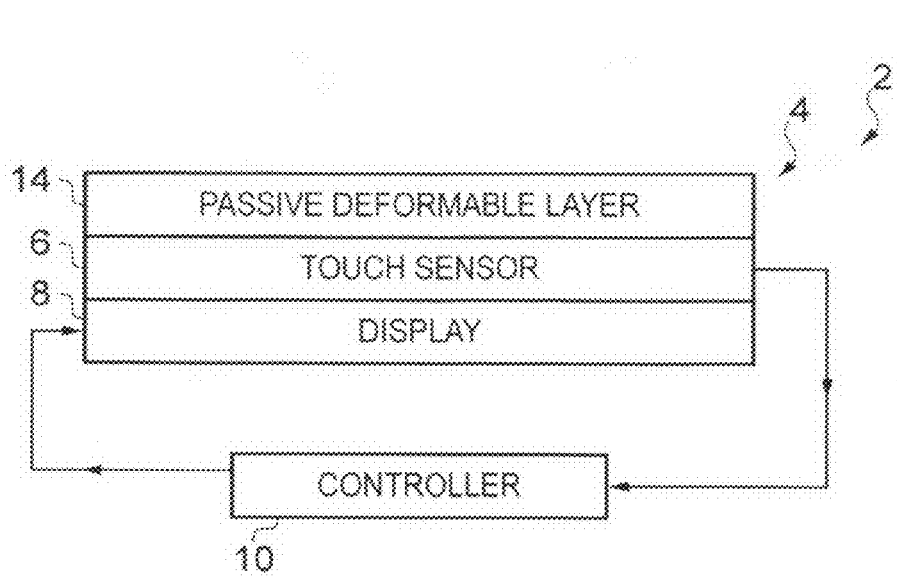
Figure 4:
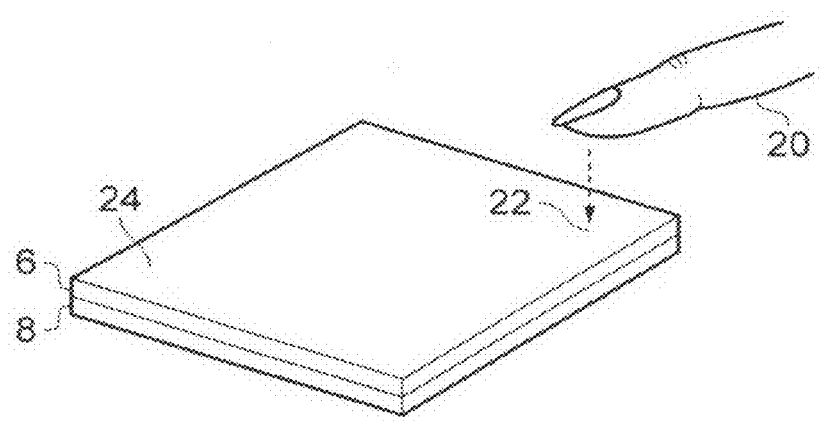
Figure 5A:
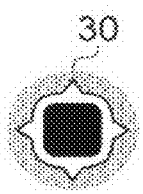
Figure 5B:
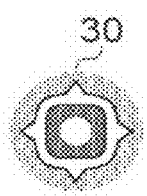
Figure 5C:
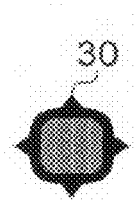
Figure 5D:
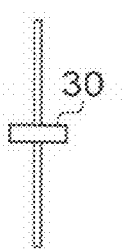
Figure 6:
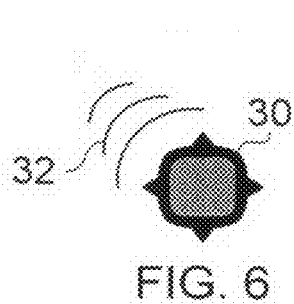
Figure 7A:
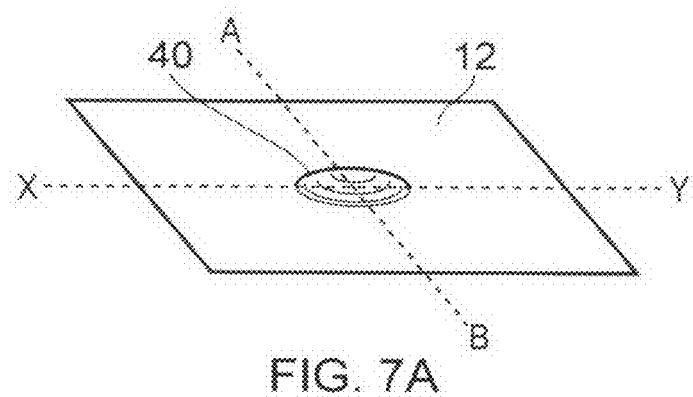
Figure 7B:
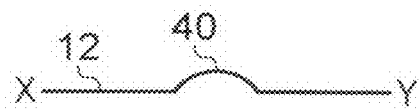
Figure 7C:
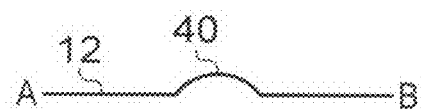
Figure 8A:
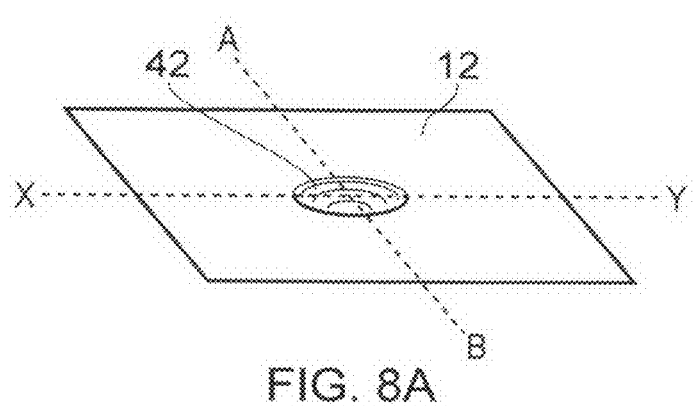
Figure 8B:
Figure 8C:
Figure 9:
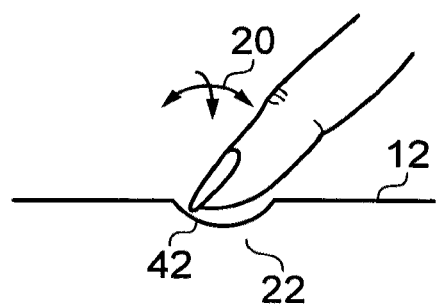
Figure 10:
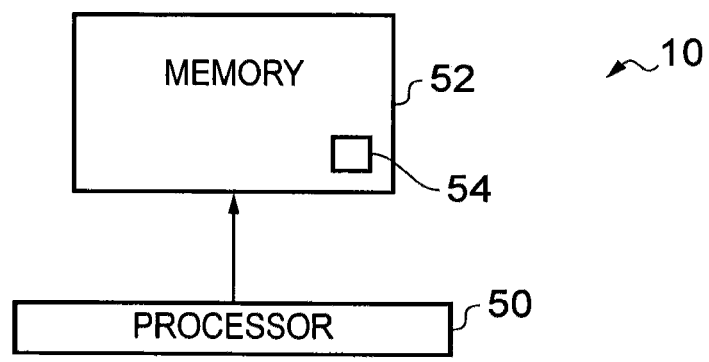

For a better understanding of various examples of embodiments of the present invention reference will now be made by way of example only to the accompanying drawings in which:

FIG. 1 schematically illustrates an apparatus comprising a user interface and a controller;

FIG. 2 schematically illustrates an apparatus comprising a user interface and a controller, where the user interface provides haptic feedback;

FIG. 3 schematically illustrates an apparatus comprising a user interface and a controller, where the user interface comprises an upper passive deformable layer;

FIG. 4 schematically illustrates how a touch sensitive input may overlie a display output;

FIGS. 5A, 5B and 5C schematically illustrate examples of joy-stick directional control icons;

FIG. 5D schematically illustrates an example of a one-dimensional directional control icon;

FIG. 6 schematically illustrates an example in which the icon provides visual representations of physical deformations of the touch sensitive input;

FIGS. 7A, 7B and 7C schematically illustrate in perspective view, lateral cross-section and longitudinal cross-section examples of an apparatus in which a local three-dimensional feature is produced in the form of a protrusion;

FIGS. 8A, 8B and 8C schematically illustrate in perspective view, lateral cross-section and longitudinal cross-section examples of an apparatus in which a local three-dimensional feature is produced in the form of a depression;

FIG. 9 schematically illustrates that a user digit may be placed on a three-dimensional feature and rocked to provide additional manual actuations;

FIG. 10 schematically illustrates an example of a controller; and

Figure 11:
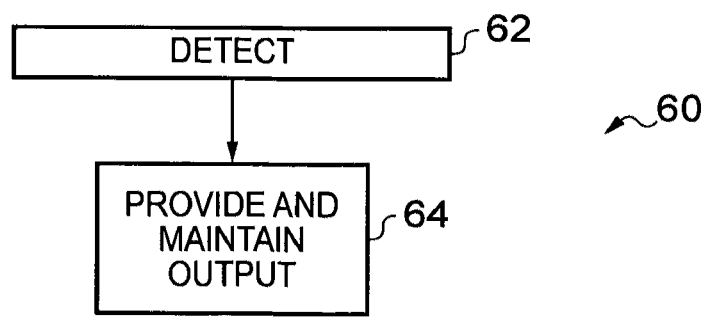

FIG. 11 schematically illustrates a method.

DETAILED DESCRIPTION

The Figures illustrate an apparatus 2 comprising: a user interface 4 comprising: a touch sensitive input 6 responsive to manual actuation; and a display output 8 associated with the touch sensitive input; and a controller 10 configured to provide and maintain, in response to a manual actuation 20 at a user selected location 22 of the touch sensitive input, an output at the user selected location to facilitate additional manual actuation 20 via the touch sensitive input 6 in the region of the user selected location 22.

FIG. 1 schematically illustrates an apparatus 2 comprising: a user interface 4 and a controller 10.

The user interface 4 comprises a touch sensitive input 6 responsive to manual actuation; and a display output 8 associated with the touch sensitive input 6.

As illustrated in FIG. 4, a touch sensitive input 6 may overlie the display output 8. In this illustrated example, a planar touch sensitive input 6 overlies a planar display output 8. The touch sensitive input 6 presents an actuation surface 24 for manual actuation 20.

The touch sensitive input 6 is a device that detects a touch on the actuation surface 24 by a user controlled instrument such as, for example, a user's digit or a stylus. It may additionally operate as a proximity detector detecting a proximal presence of a user's digit or a stylus. The term touch sensitive input 6 should be considered to encompass not only touch actuated devices but also proximity (near touch) actuated devices.

The touch sensitive input 6 may use any suitable technology to sense a touch or near touch. For example, the touch sensitive input may be capacitive, resistive, or optical.

The display output 8 may be any suitable display device that is capable of rendering images. It may, for example, be a liquid crystal display or an organic light emitting diode display.

The controller 10 is configured to provide control outputs to the display output 8 and to receive control inputs from the touch sensitive input 6.

The controller 10 is configured to provide and maintain, in response to a manual actuation 20 at a user selected location 22 of the touch sensitive input 6, an output at the user selected location to facilitate additional manual actuation 20 via the touch sensitive input 6.

In the example of FIG. 1, the output provided and maintained in the region of the user selected location 22 by the controller 10 is an output 30 in the display output 8 (see FIGS. 5A-D, 6).

FIGS. 5A, 5B, 5C and 5D schematically illustrate examples of different icons 30 which are provided and maintained as an output 30 in the display output 8 in the region of the user selected location 22 by the controller 10. Each icon 30 facilitates additional user actuation in the region of the user selected location 22.

The icons 30 in FIGS. 5A, 5B and 5C are examples of joy-stick control icons that are useful for controlling objects, particularly small objects, presented in the display output 8. A joy-stick control icon may, for example, be a two-dimensional control icon with four degrees of freedom (e.g. up, down, left, right) or may, for example, be a three-dimensional control icon with six degrees of freedom (e.g. up, down, left, right, zoom-in, zoom-out) The user is able to enter different commands by actuating different portions of the icon 30. For example actuating an uppermost portion of the icon generates an 'up' directional command, actuating a lowermost portion of the icon generates a 'down' directional command, actuating a leftmost portion of the icon generates a 'left' directional command and actuating a rightmost portion of the icon generates a 'right' directional command. The icon has different visual indications at it uppermost, lowermost, leftmost and rightmost portions that disambiguate the different user commands available.

The icon 30 in FIG. 5D is an example of a slider joy-stick or one-dimensional directional control icon. The user is able to enter different commands by actuating different portions of the icon. For example actuating an uppermost portion of the icon 30 generates an 'up' directional command, actuating a lowermost portion of the icon generates a 'down' directional command. The icon has visual indications at it uppermost and lowermost, portions that disambiguate the different user commands available by manually actuating them.

The controller 10, depending upon the nature of the input required from a user, can provide and maintain the appropriate icon 30 to facilitate user input. The controller 10 may be configured to dynamically vary the icon 30 in response to an additional manual actuation. For example, the color, shape, size or background of the icon may be changed in dependence upon the force applied to the icon.

FIG. 6 schematically illustrates an example in which the icon 30 has visual representations 32 of physical deformations of the touch sensitive input 6. In this example, the visual representations on the display output 8 give the illusion that the actuation surface 22 of the touch sensitive input 6 is deformed in the region of the icon 30.

In the example of FIG. 2, the output provided and maintained in the region of the user selected location 22 by the controller 10 is a haptic output which may, for example, be a local deformation (see FIGS. 7A-7C, 8A-8C). In the example of FIG. 2, the user interface 4 of the apparatus 2 additionally comprises an active haptic device 12 associated with at least part of an upper surface of the touch sensitive input 6. The haptic device 12 is active in the sense that it is controlled by the controller 10.

The haptic device 12 may, for example, comprise an electro-active polymer/gel between transparent electrodes, such as indium tin oxide electrodes. The application of a differential voltage across a pair of electrodes separated by the electro-active material in the region of the user selected location 22 results in a local physical deformation of the electro-active material to form, for example, a protuberance such as projection 40 illustrated in FIGS. 7A-7C or a depression such as indentation 42 illustrated in FIGS. 8A-8C.

The deformation creates a three-dimensional user input feature that facilitates additional user actuation in the region of the user selected location 22. As schematically illustrated in FIG. 9, a user digit may be placed on the three-dimensional feature at the user selected location 22 and rocked to provide additional manual actuations via the touch sensitive input 6 that are interpreted as joy-stick control commands. The deformation may remain fixed/static and typically does not dynamically vary in response to the facilitated additional manual actuation.

The apparatus 4 schematically illustrated in FIG. 3 is similar to the apparatus 4 illustrated in FIG. 1 except that it additionally comprises a passive deformable layer 14 that deforms in response to the manual actuation 20 at the user selected location 22 of the touch sensitive input. The deformable layer 14 is passive in the sense that it is not controlled by the controller 10 or any other device. The deformable layer 14 overlies the touch sensitive input 6 and the display output 8 associated with the touch sensitive input 6.

The deformable layer 14 is typically transparent so that the display output 8 is visible to a user through it.

The deformable layer 14 compresses and/or stretches and/or wrinkles locally around the user selected location 22 of the touch sensitive input. It may, for example, be a soft transparent elastomer such as the softest grade of Kuraray's LA-polymer and gels or a low modulus silicone such as Dow Corning's Sylgard elastomers.

The deformable layer 14 is resilient. When the manual actuation 20 that causes the deformation at the user selected location 22 of the touch sensitive input is removed, the deformation is also removed. While the manual actuation 20 that causes the deformation at the user selected location 22 of the touch sensitive input is present, the deformation is also present.

When the touch sensitive input 6 is a capacitive sensor, the deformable layer may be configured as a deformable dielectric. The input at the touch sensitive input 6 is dependent upon the area of the capacitor formed between the user's approaching digit and the touch sensitive input 6, the distance between the user's approaching digit and the touch sensitive input 6, and the relative dielectric permittivity of the dielectric between the user's approaching digit and the touch sensitive input 6. The deformable layer 14 will resist, as it resiliently deforms, the movement of the user's approaching digit towards the touch sensitive input 6. Different levels of force applied by the user's approaching digit to deform the deformable layer 12 result in different deformations of the deformable layer and different inputs at the touch sensitive input 6. These different inputs may be distinguished by the controller 10 to determine, for example, an actuation intensity at the touch sensitive input 6, for example, whether the manual actuation is soft, or medium or hard. The controller 10 may use the intensity of the actuation as an input to determine an appropriate command.

In one embodiment, no (or little) contact at a position may result in the controller 10 interpreting this as a normal touch input that, for example, selects a graphical item at the position. However, if instead the actuation had been a medium intensity actuation, then the controller 10 provides and maintains, in response to the manual actuation 20 at a user selected location 22 of the touch sensitive input, an output at the user selected location to facilitate additional manual actuation 20 via the touch sensitive input 6 in the region of the user selected location 22. Additional manual actuations of a medium or light intensity may be interpreted as directional input controls. A high intensity actuation may, however, be interpreted as a different command.

In the preceding embodiments, the controller 10 is configured to provide and maintain, in response to a manual actuation 20 at a user selected location 22 of the touch sensitive input, an output at the user selected location to facilitate additional manual actuation 20 via the touch sensitive input 6 in the region of the user selected location 22.

According to one embodiment, the controller 10 creates a virtual origin (X, Y) at the user selected location 22.

An additional manual actuation at location (x, y) is then converted to relative displacements x-X, y-Y from the origin. The additional manual actuation may be as a consequence of a separate discrete actuation or as a result of continuing the manual actuation 20. The manual actuation 20 may, for example, be continued by tracing a user's digit or a stylus over the actuation surface or by stretching or deforming a deformable layer 14.

The relative displacements are associated with different commands (or no commands).

The controller 10 is therefore able to determine the appropriate command associated with the additional manual actuation based on the location (x, y) of the additional manual actuation from the virtual origin (X, Y).

It will therefore be appreciated that a user can selectively choose the location of the virtual origin where the output that facilitates additional manual actuation 20 is positioned.

The controller 10 may be implemented using instructions that enable hardware functionality, for example, by using executable computer program instructions in a general-purpose or special-purpose processor that may be stored on a computer readable storage medium (disk, memory etc) to be executed by such a processor.

Referring to FIG. 10, the processor 50 is configured to read from and write to the memory 52. The processor 50 may also comprise an output interface via which data and/or commands are output by the processor 50 and an input interface via which data and/or commands are input to the processor 50.

The memory 52 stores a computer program 54 comprising computer program instructions that control the operation of the apparatus 2 when loaded into the processor 50. The computer program instructions 54 provide the logic and routines that enables the apparatus to perform the methods described. The processor 50 by reading the memory 52 is able to load and execute the computer program 54.

The computer program 54 comprises computer program instructions which when loaded into a processor 50 enable the processor to provide and maintain, in response to an input indicative of a manual actuation at a user selected location of a touch sensitive input, an output at the user selected location to facilitate additional manual actuation via the touch sensitive input in the region of the user selected location.

The computer program may arrive at the apparatus 2 via any suitable delivery mechanism. The delivery mechanism may be, for example, a computer-readable storage medium, a computer program product, a memory device, a record medium such as a compact disc read-only memory (CD-ROM) or digital versatile disc (DVD), an article of manufacture that tangibly embodies the computer program 54. The delivery mechanism may be a signal configured to reliably transfer the computer program 54.

The apparatus 2 may propagate or transmit the computer program [REF] as a computer data signal.

Although the memory 54 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

FIG. 11 schematically illustrates a method 60.

At block 62, of the method 60, manual actuation at a user selected location of a touch sensitive input is detected.

Next at block 64, of the method 60, an output at the user selected location is provided and maintained to facilitate additional manual actuation via the touch sensitive input in the region of the user selected location.

As used here 'module' refers to a unit or apparatus that excludes certain parts/components that would be added by an end manufacturer or a user.

The user interface comprising the touch sensitive input responsive to manual actuation; and the display output associated with the touch sensitive input may be provided as a module. This module may additionally comprise a haptic device 12 and/or a deformable layer 14.

The user interface and the controller may be provided as a module. The user interface comprises the touch sensitive input responsive to manual actuation and the display output associated with the touch sensitive input. The module may additionally comprise a haptic device 12 and/or a deformable layer 14.

The controller may be provided as a module separate to the user interface 4. The blocks illustrated in the FIG. 11 may represent blocks in a method and/or sections of code in the computer program 54. The illustration of a particular order to the blocks does not necessarily imply that there is a required or preferred order for the blocks and the order and arrangement of the block may be varied. Furthermore, it may be possible for some blocks to be omitted.

Although embodiments of the present invention have been described in the preceding paragraphs with reference to various examples, it should be appreciated that modifications to the examples given can be made without departing from the scope of the invention as claimed. For example, although the passive deformable layer illustrated in FIG. 3 is in combination with the embodiment described with reference to FIG. 1, it may also be used in combination with the embodiment described with reference to FIG. 2.

It should be appreciated that although FIGS. 1, 2 and 3 illustrate a particular order of components, the order illustrated may be varied and may be arranged in any order that works. For example, if the touch sensitive input 6 is capacitive then it can be below a top surface. A touch sensitive input 6 can be in any position that allows it to sense actuations directly or indirectly. For example, the haptic device 12 can be below the top surface. It can be in any position that allows it to provide haptic feedback directly or indirectly. For example, the display output 8 can be below the top surface. It can be in any position that allows it to be visible.

The preceding paragraphs have described various examples of an apparatus 2 comprising: a user interface 4 comprising: a touch sensitive input 6 responsive to manual actuation; and a display output 8 associated with the touch sensitive input. Although the preceding descriptions have described a single manual actuation at a time, it should be appreciated that it is also possible to have two simultaneous manual actuations at different locations. In this example, controller 10 may be configured to provide and maintain, in response to a first manual actuation at a first user selected location of the touch sensitive input, a first output at the first user selected location to facilitate additional manual actuation via the touch sensitive input 6 in the region of the first user selected location and/or may be configured to provide and maintain, in response to a second manual actuation at a second user selected location of the touch sensitive input (that is substantially simultaneous with the first manual actuation), a second output at the second user selected location to facilitate additional manual actuation via the touch sensitive input 6 in the region of the second user selected location.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
   a capacitive touch sensitive input;
   a display output associated with the capacitive touch sensitive input;
   a passive deformable layer overlying the capacitive touch sensitive input and the display output and configured to deform in response to a manual actuation on the passive deformable layer at a user selected location, wherein the passive deformable layer is transparent to allow the display output to be visible through the passive deformable layer;
   wherein the capacitive touch sensitive input is configured to provide a control output in dependence upon a capacitor formed between a user's digit and the capacitive touch sensitive input caused by deformation of the passive deformable layer by a manual actuation, the control output indicative of the actuation intensity of the manual actuation; and
   a controller configured to receive the control output from the capacitive touch sensitive input and to determine the actuation intensity of the manual actuation on the passive deformable layer and to control the display output to display an output in the region of the user selected location in dependence upon the determined actuation intensity.

2. An apparatus as claimed in claim 1, wherein the capacitive touch sensitive input is a planar, capacitive touch sensitive input.

3. An apparatus as claimed in claim 1, wherein the display output is a planar display output.

4. An apparatus as claimed in claim 1, wherein the passive deformable layer overlies the capacitive touch sensitive input and the display output in a stack.

5. An apparatus as claimed in claim 1, wherein the passive deformable layer is resilient.

6. An apparatus as claimed in claim 1, wherein the passive deformable layer is a deformable dielectric.

7. An apparatus as claimed in claim 1, wherein the controller is configured to use the actuation intensity of the manual actuation to determine an appropriate command.

8. An apparatus as claimed in claim 1, wherein the controller is configured to provide and maintain an icon on the display output at the location of the manual actuation in response to determining that the actuation intensity of the manual actuation is above an intensity threshold, wherein the icon facilitates additional manual actuation.

9. A method comprising:
   detecting, by a capacitive touch sensitive input, manual actuation at a user selected location on a passive deformable layer of an apparatus wherein the passive deformable layer is overlaying the capacitive touch sensitive input and a display output associated with the capacitive touch sensitive input and wherein the passive deformable layer is transparent to allow the display output to be visible through the passive deformable layer, determining an actuation intensity of the manual actuation based on a capacitor formed between a user's digit and the capacitive touch sensitive input caused by the manual actuation; and controlling the display output to display an output in the region of the user selected location in dependence upon the determined actuation intensity of the manual actuation.

10. A method as claimed in claim 9, wherein controlling the apparatus comprises controlling a display output.

11. A method as claimed in claim 10, comprising providing and maintaining an icon on the display output at the location of the manual actuation in response to determining that the actuation intensity of the manual actuation is above an intensity threshold, wherein the icon facilitates additional manual actuation.

12. A method as claimed in claim 9, comprising using the actuation intensity of the manual actuation to determine an appropriate command.

13. A method as claimed in claim 9, comprising determining whether the manual actuation is a soft manual actuation, a medium manual actuation or a hard manual actuation.

14. A non-transitory computer readable medium embodying a computer program which when executed by at least one processor causes an apparatus to perform at least the method of claim 9.

15. An apparatus comprising:
a planar capacitive touch sensitive input;
a planar display output stacked with the capacitive touch sensitive input;
a transparent passive deformable layer overlying the capacitive touch sensitive input and the display output and configured to deform in response to a manual actuation on the passive deformable layer at a user selected location, wherein the passive deformable layer is transparent to allow the display output to be visible through the passive deformable layer;
wherein the capacitive touch sensitive input is configured to provide a control output in dependence upon a change in distance between the passive deformable layer and the capacitive touch sensitive input caused by deformation of the passive deformable layer by a manual actuation, the control output indicative of the actuation intensity of the manual actuation; and
a controller comprising a processor and a memory, the memory comprising computer program instructions that when executed by the processor cause the processor to at least receive the control output from the capacitive touch sensitive input and to determine the actuation intensity of the manual actuation on the passive deformable layer and to control the planar display output to display an output in the region of the user selected location in dependence upon the determined actuation intensity.

* * * * *